(No Model.)
S. H. CAWLEY.
GAGE AND HOLDER FOR WELDING TIRES, &c.
No. 464,427. Patented Dec. 1, 1891.
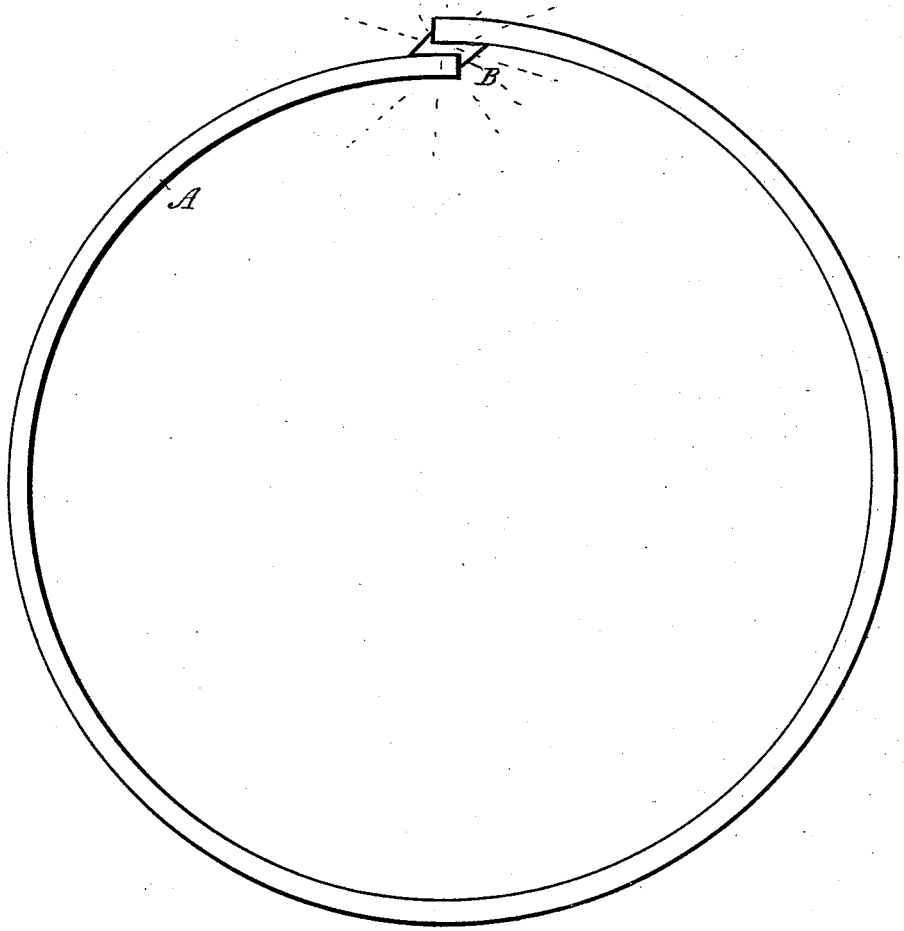
Fig. I.
Fig. II.
Witnesses
L. Thomas
R. S. Millar
Inventor.
S. H. Cawley
By J. S. Ailey Atty.

UNITED STATES PATENT OFFICE.

SAMUEL H. CAWLEY, OF TROY, OHIO, ASSIGNOR TO WILLIAM YOUTSEY, OF SAME PLACE.

GAGE AND HOLDER FOR WELDING TIRES, &c.

SPECIFICATION forming part of Letters Patent No. 464,427, dated December 1, 1891.

Application filed September 10, 1891. Serial No. 405,355. (No model.)

*To all whom it may concern:*

Be it known that I, SAMUEL H. CAWLEY, of Troy, in the county of Miami and State of Ohio, have invented a new and useful Improvement in Gage and Holder for Welding Tires, &c., which improvement is fully set forth in the following specification and accompanying drawings, in which—

Figure 1 is a side elevation of a wheel-tire provided with my improved gage and holder and prepared for welding, and Fig. 2 a detail view of my improved gage and holder.

My invention relates to improvements in metal-welding generally, and in particular to a novel method of welding tires for vehicle-wheels.

Its object is to provide a single, inexpensive, and reliable device whereby the process may be greatly facilitated and rendered more complete in less time and with half the labor usually required to accomplish the work. The process as generally performed consists in scarfing the ends of the bar or tire to furnish an adequate lap. The ends are thus made too thin and there is not sufficient material at the extremities to insure a perfect weld. There is, moreover, no security against the slipping of the adjoining parts during the progress of the work, and as a consequence when the operation is completed the tire is liable to be either too long or too short and the labor must be repeated. My invention is designed to evade all such defective methods and to render the process certain in its operation and perfect in its results.

Referring to the accompanying drawings, A designates the tire of a vehicle-wheel. The bar of iron which is used for the purpose is first cut at the exact length required for the tire, and when bent is made a fraction smaller in circumference than the wheel for which it is intended, so that when the ends are brought together they lap or pass each other. A gage B, formed as shown in the drawings, is interposed between the lapping ends, where it is retained by the inward spring-pressure of the tire, which is thus locked and held in the proper position for welding. It is obvious that the ends of the gage being scarfed, the necessity of scarfing the ends of the tire to effect a perfect weld is avoided and less time and labor are required to perform the work. The gage may be made of iron or steel. The former metal is preferable, as it can be used for either steel or iron tires.

It will be understood that the proper length of lap for wheels of all sizes is determined by rule and the gages are made accordingly. The quantity of the metal or metals composing the joint is thus accurately regulated, and when the weld is reduced and made uniform in width and thickness with the other part of the tire it will be found that it has the exact circumference required. It will also be observed that the metal being in a compact mass at the joint there are no thin ends to render the weld scaly and imperfect.

What I claim as new is—

A device for welding metal bars or wheel-tires, consisting of the herein shown and described gage and holder to be inserted between the lapped ends of the tire and adapted to be welded and incorporated with the tire, substantially as and for the purposes herein set forth.

In testimony that I claim the foregoing I have hereunto set my hand this 21st day of August, 1891, in the presence of witnesses.

SAMUEL H. CAWLEY.

Witnesses.
JAMES H. MEANS,
W. F. ROSS.

It is hereby certified that in Letters Patent No. 464,427, granted December 1, 1891, upon the application of Samuel H. Cawley, of Troy, Ohio, for an improvement in "Gages and Holders for Welding Tires, Etc.," an error appears in the printed specification requiring the following correction, viz.: In line 17, page 1, the word "single" should read *simple;* and that the said Letters Patent should be read with this correction therein that the same may conform to the record of the case in the Patent Office.

Signed, countersigned, and sealed this 8th day of December, A. D. 1891.

[SEAL] CYRUS BUSSEY,
*Assistant Secretary of the Interior.*

Countersigned:
W. E. SIMONDS,
*Commissioner of Patents.*